May 8, 1923.
J. T. HOLMQUIST
1,454,512
ACCELERATOR FOR AUTOMOBILE ENGINES
Filed March 15, 1922
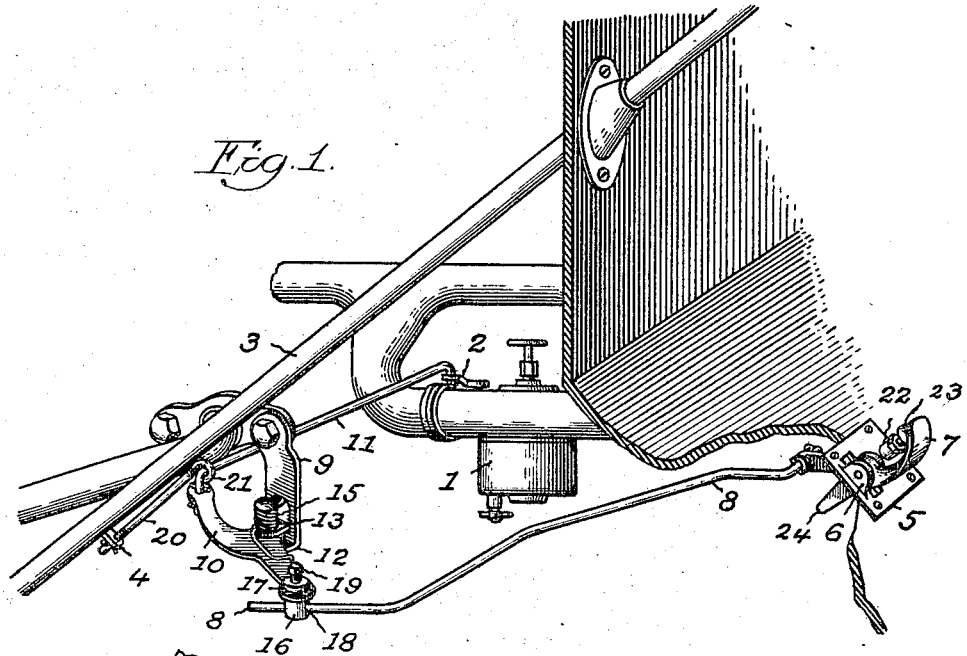
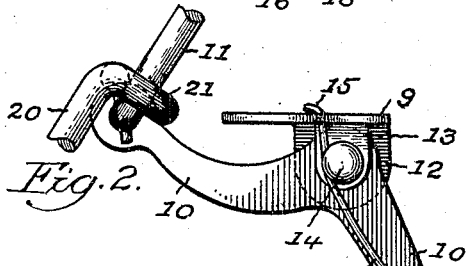
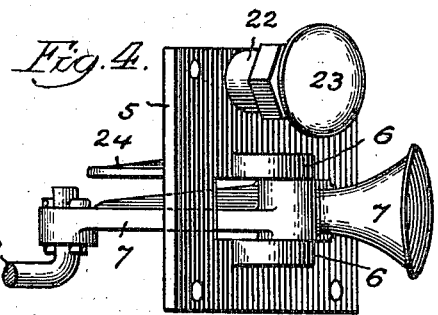
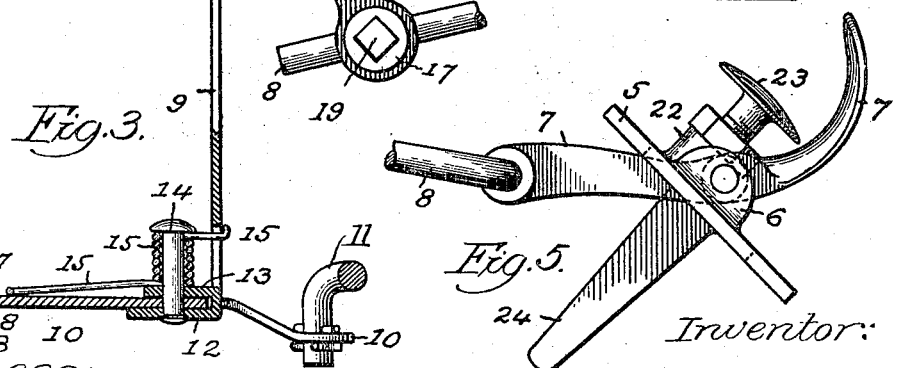
Witness:
John Enders
Inventor:
John T. Holmquist,
by Robert Burns,
Atty.

Patented May 8, 1923.

1,454,512

UNITED STATES PATENT OFFICE.

JOHN T. HOLMQUIST, OF CHICAGO, ILLINOIS.

ACCELERATOR FOR AUTOMOBILE ENGINES.

Application filed March 15, 1922. Serial No. 543,854.

*To all whom it may concern:*

Be it known that I, JOHN T. HOLMQUIST, a citizen of the United States of America, residing in Chicago, in the county of Cook and State of Illinois, have invented certain new and useful Improvements in Accelerators for Automobile Engines, of which the following is a specification.

This invention relates to means, commonly known as accelerators, for regulating the throttle valve between the carburetor and the intake of automobile engines, and has for its objects:—

To provide a structural formation and association of parts and mechanisms whereby a combined hand and foot control is attained in an inter-connected manner and without interference of the hand control with the foot control or vice-versa.

To provide a construction and arrangement of the pedal base of an accelerator mechanism adapted to afford ease and accuracy in the operation of the same and at the same time guard the mechanisms in its operation from interference with adjacent vehicle parts due to sagging or shifting of such parts in continued actual use.

To provide an economical and substantial formation of the bell crank bracket of an accelerator, adapted to afford an efficient and accurate operation of the parts, with a minimum amount of frictional retardance and without liability to binding of the parts, all as will hereinafter more fully appear.

In the accompanying drawing:—

Fig. 1, is a detail perspective view illustrating the general arrangement of parts in the present improvement.

Fig. 2, is an enlarged detail plan view of the bell crank, hanger bracket therefor and associated parts of the mechanism.

Fig. 3 is a sectional elevation of the same.

Fig. 4, is an enlarged detail plan view of the pedal lever, supporting base and connections of the mechanism.

Fig. 5, is a side elevation of the same.

Like reference numerals indicate like parts in the several views.

Referring to the drawing, 1 designates the carbureter of a motor vehicle, and connected to the intake of the engine, thereof by the usual fuel supply duct in which is arranged a throttle valve having the usual arm 2, by which said valve is operated.

3 designates the steering post of the vehicle, of the type which carries a revoluble operating rod one end of which is provided with an operating arm and index quadrant adjacent to the steering wheel for manual adjustment by the operator. The other end of said rod being provided with a crank arm 4 that has operative connection in manner hereinafter described with the aforesaid arm 2 of the engine throttle valve.

5 designates a base plate secured to the foot board of the vehicle and formed with pivot ears 6 for the pivotal support of the pedal lever 7, one end of which is formed with an expanded foot rest, while the other end has pivotal connection with a connecting rod 8 extending to a bell crank mechanism, as follows:—

9 designates a hanger bracket arranged forward of the base plate 5 aforesaid, and in lateral relation to the carbureter 1, and secured in place on the engine frame, usually by the rear bolt of the water hose connection of the engine.

10 designates a bell crank pivoted on the horizontal arm of the hanger bracket 9 and preferably in the manner hereinafter described, with one of its arms pivotally connected to the connecting rod 8 aforesaid, preferably in the manner hereinafter described, while the other arm of the bell crank has direct connection through a connecting rod 11 with the operating arm 2 of the engine throttle valve.

In the preferred pivotal connection of the bell crank 10 to the hanger bracket 9, the said bracket is formed with a bottom flange or pivot ear 12 and with an upper flange or pivot ear 13, formed by slitting and bending the metal of the bracket body as shown more particularly in Fig. 3.

14 designates a pivot pin arranged in aligned orifices in the ears 12 and 13 to form a pivot for the bell crank 10 in its arrangement between said ears. The pivot pin 14 extends a distance above the upper pivot ear 12 to form a supporting post for an operating spring as follows:—

15 designates a coiled spring encircling the post above described, and provided with oppositely extending portions, one of which has bearing in an orifice in the body of the hanger bracket 9, while the other portion is formed with a looped end adapted to engage an arm of the bell crank 10, with the tendency of the spring to resiliently move the bell crank lever into a normal retracted position.

16 designates an internally screw threaded sleeve fitting an orifice in the end of one arm of the bell crank 10 and having a stop flange 17 at its upper end adapted to abut against the upper surface of the arm and hold the sleeve in place.

18 designates a transverse orifice formed midway the height of the sleeve 16 and adapted to receive in an adjustable manner the adjacent end of the connecting rod 8 aforesaid.

19 designates a set screw engaging the screw threaded bore of the sleeve 16 and having bearing against the connecting rod 8 to firmly secure the same at the required adjustment in the receiving orifice therefor in the sleeve 16, and as so formed a ready means for the assembly and adjustment of the parts is provided.

20 designates a connecting rod pivotally connected at one end to the aforesaid crank arm 4 of the manually adjusted mechanism associated with the steering post of the vehicle. In the present construction the other end of the rod 20 is formed with an angularly disposed eye 21 adapted to encircle the adjacent end of the aforesaid connecting rod 8 in a manner to permit an active movement of the rod 8 under the influence of the bell crank 10, and in a direction towards the arm 4, without any interference with the adjustment at which the arm 4 had been set by its manual actuating means. In a positive or active movement of the crank arm 4, the eye 21 is adapted to have bearing against the arm of the bell crank 10 which has connection with the rod 8, and in an adjustment of said crank arm 4, a corresponding movement of the bell crank 10, and connecting rods 8 and 11 takes place against the stress of the spring 15 aforesaid.

22 designates a screw threaded neck or boss on the base plate 5 to one side of the pivot ears 6 and pedal lever 7 thereof, and adapted to receive the screw threaded stem of an adjustable stop head or button 23, to constitute a stop or rest for the foot of the operator and prevent excessive movement of the pedal lever 7, and yet permit of such undue movement by a lateral rocking of the operator's foot when increased acceleration is suddenly required or deemed necessary.

24 designates a guard prong extending from the underside of the base plate 5 in lateral and parallel relation to the under arm of the pedal lever 7, and adapted by contact with an adjacent part of the vehicle frame or mechanism, to support the base plate 5 and the foot board carrying the same from undue sagging after continued use, and thus prevent interference with the normal operation of the pedal lever and its connections.

Having thus fully described my invention, what I claim as new and desire to secure by Letters Patent is:—

1. In an accelerator mechanism of the type described, the combination of an intermediate bell crank, a hanger bracket formed with upper and lower pivot ears adapted to fit opposite sides of the bell crank, a pivot pin extending through said ears and bell crank and having an upper extension forming a supporting post and a coiled spring encircling said post and having end extensions engaging the bell crank and the bracket respectively.

2. In an accelerator mechanism of the type described, the combination of an intermediate bell crank, a spring to move the bell crank in one direction, an internally screw threaded sleeve revolubly mounted in one arm of the bell crank and having a lateral orifice intermediate its length a connecting rod fitting said orifice, and a set screw arranged in the bore of said sleeve and adapted to have bearing against said connecting rod.

3. In an accelerator mechanism of the type described, the combination of a base plate having pivot ears on one side and a rigid extension or prong on its other side, a pedal lever pivoted in said ears and extending in a plane to one side and parallel to the aforesaid prong, and means for connecting said lever with the arm of the engine throttle valve.

4. In an accelerator mechanism of the type described, the combination of a base plate having pivot ears and a screw threaded neck arranged at one side of said pivot ears, a pedal lever pivoted in said ears, operative connections between said lever and the arm of the engine throttle valve, and an adjustable stop head having a screw threaded shank engaging the aforesaid neck on the base plate.

Signed at Chicago, Illinois, this 14th day of March A. D., 1922.

JOHN T. HOLMQUIST.